United States Patent [19]

Zurbrick

[11] Patent Number: 5,047,619
[45] Date of Patent: Sep. 10, 1991

[54] HIGH DENSITY DATA TRACK LAYOUT FOR STORAGE MEDIA

[75] Inventor: Larry S. Zurbrick, San Jose, Calif.

[73] Assignee: Drexler Technology Corporation, Mountain View, Calif.

[21] Appl. No.: 381,560

[22] Filed: Jul. 18, 1989

[51] Int. Cl.$^5$ ............... G06K 7/10; G11B 7/007
[52] U.S. Cl. ............... 235/488; 235/487; 235/494; 369/275.3
[58] Field of Search ............... 235/487, 488, 494, 380, 235/381, 462; 369/275.3, 278, 275.1

[56] References Cited

U.S. PATENT DOCUMENTS

| | | | |
|---|---|---|---|
| 3,643,068 | 2/1972 | Mohan et al. | 235/494 X |
| 3,654,435 | 4/1972 | Vaccaro | 235/494 X |
| 3,959,631 | 5/1976 | Otten | 235/487 X |
| 4,588,882 | 5/1986 | Buxton | 235/487 |
| 4,634,850 | 1/1987 | Pierce et al. | 235/487 |
| 4,754,128 | 6/1988 | Takeda et al. | 235/488 |

*Primary Examiner*—Stuart S. Levy
*Assistant Examiner*—Steven M. duBois
*Attorney, Agent, or Firm*—Schneck & McHugh

[57] ABSTRACT

A data storage medium having a pattern representing data bits arranged in a plurality of interlocked triangularly shaped tracks. The medium may be a prerecorded optical storage material having a set of optically contrasting marks arranged in the tracks. The track width increases from a start point to an end point at a constant rate that depends on the maximum allowable angle of skew. The medium, which can be prerecorded with the pattern using exposure to actinic radiation through a like-patterned master, can have either a card, tape or drum format.

20 Claims, 4 Drawing Sheets

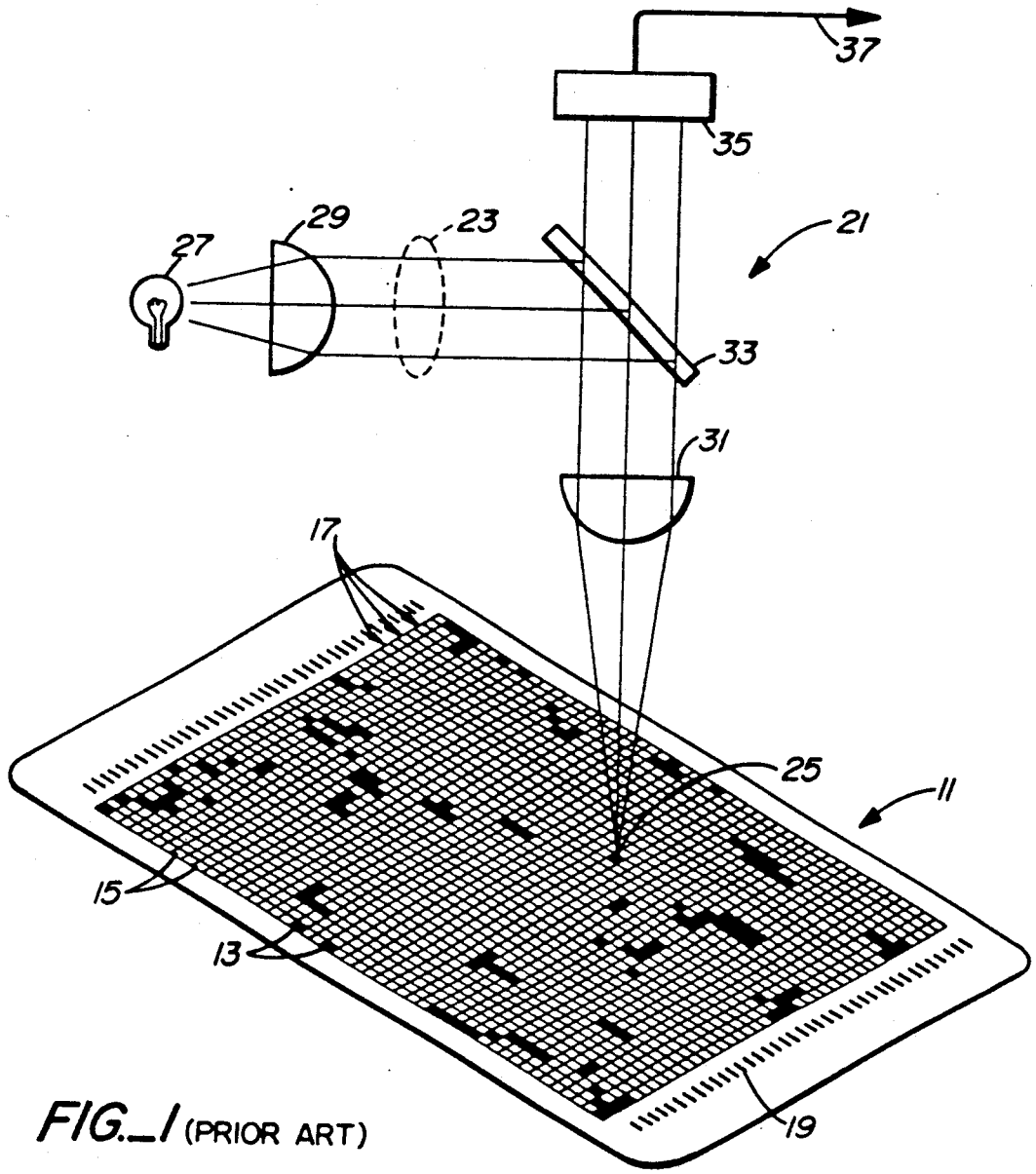
FIG._1 (PRIOR ART)
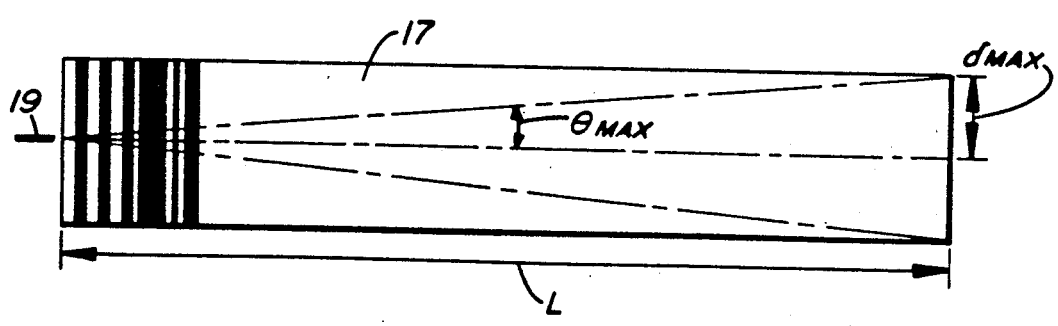
FIG._1A (PRIOR ART)

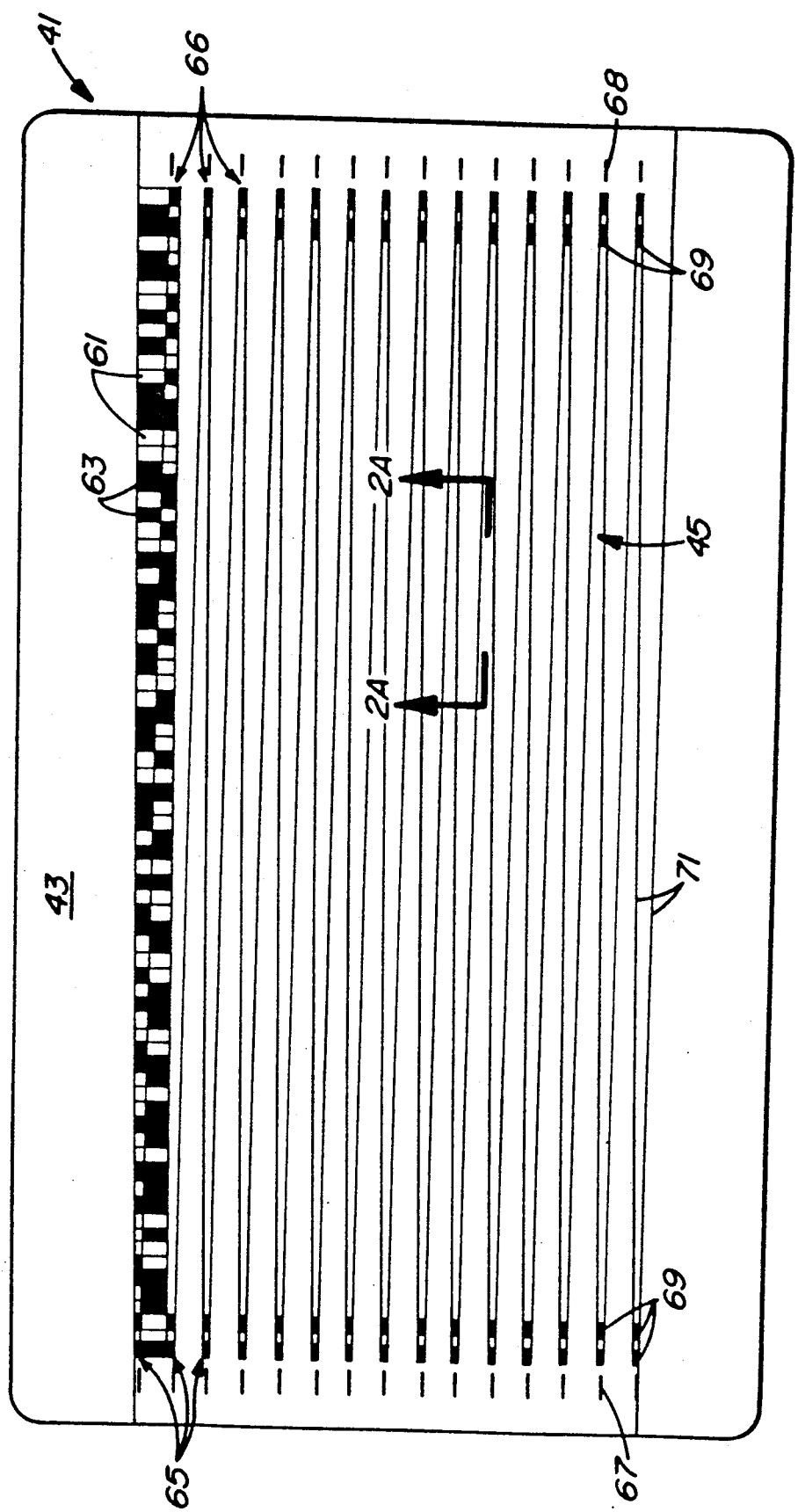
FIG._2
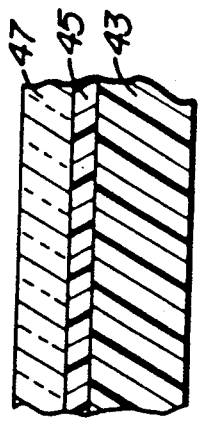
FIG._2A

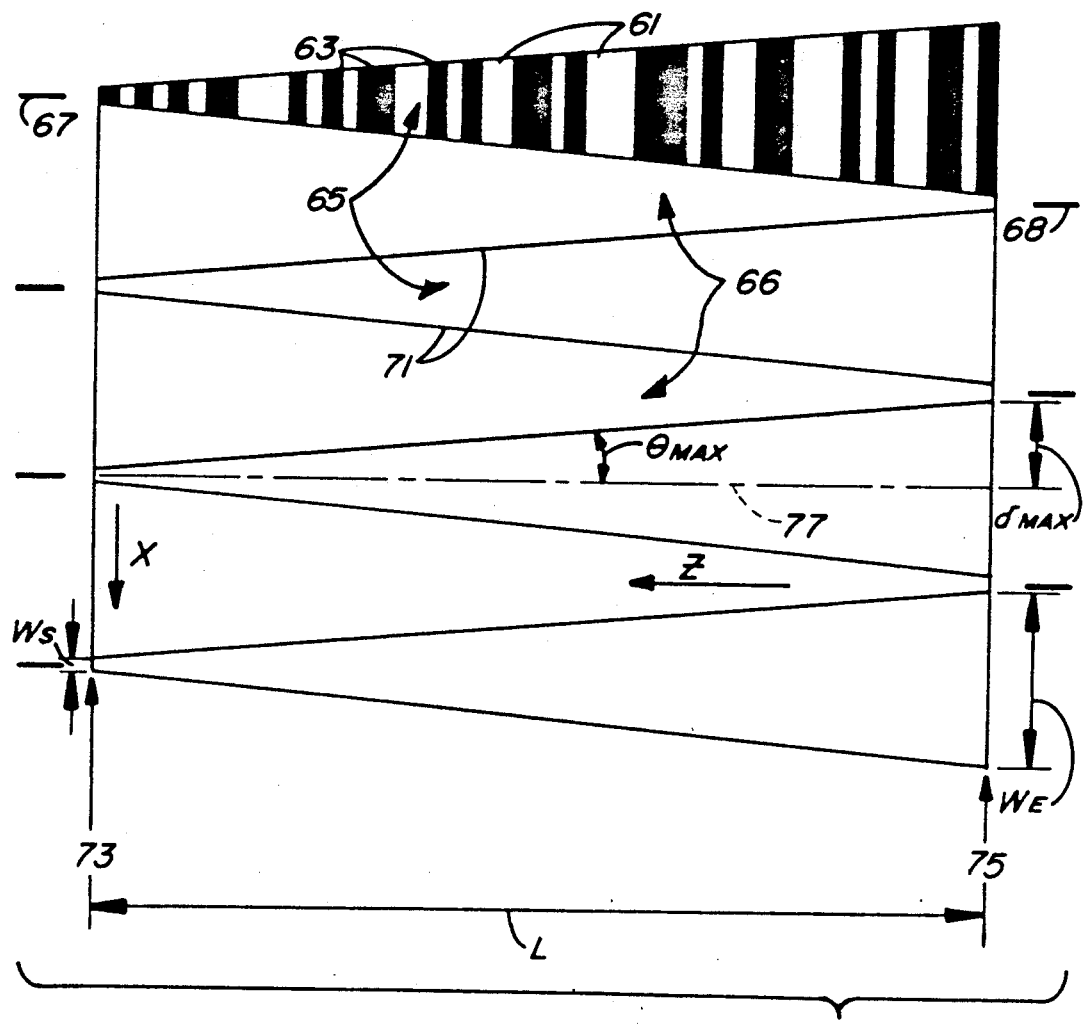
FIG._3
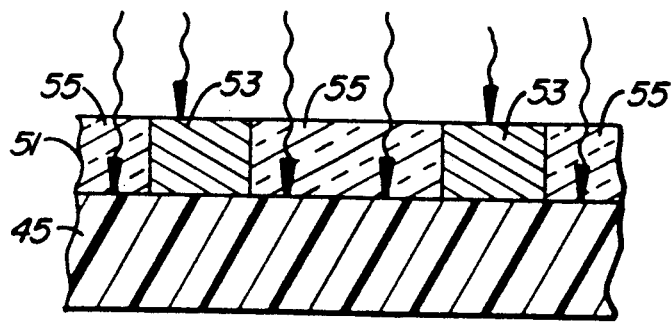
FIG._4

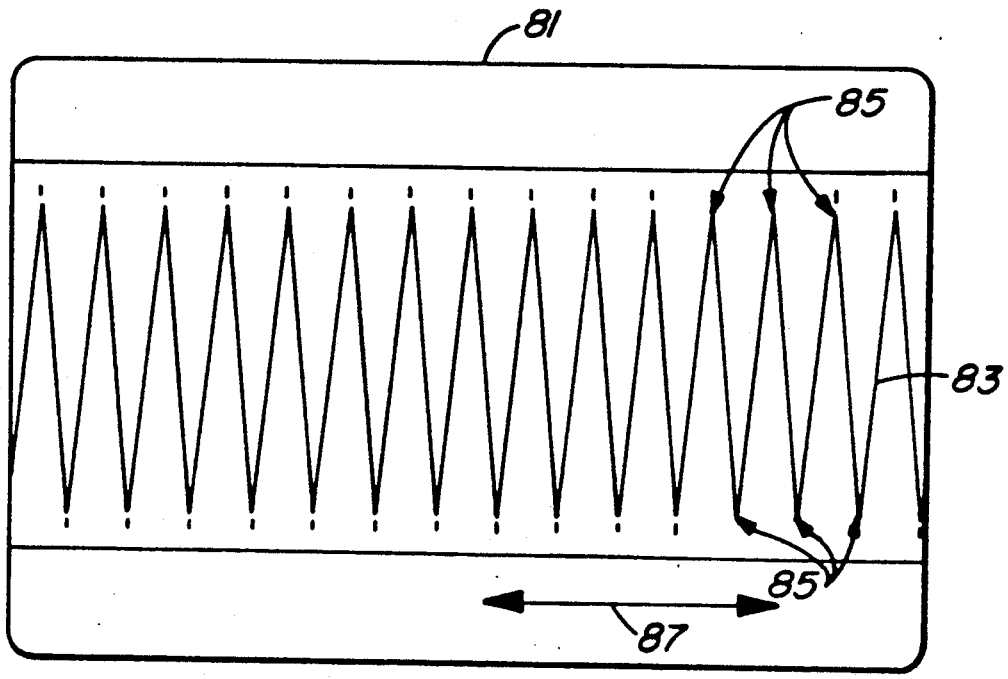
FIG._5
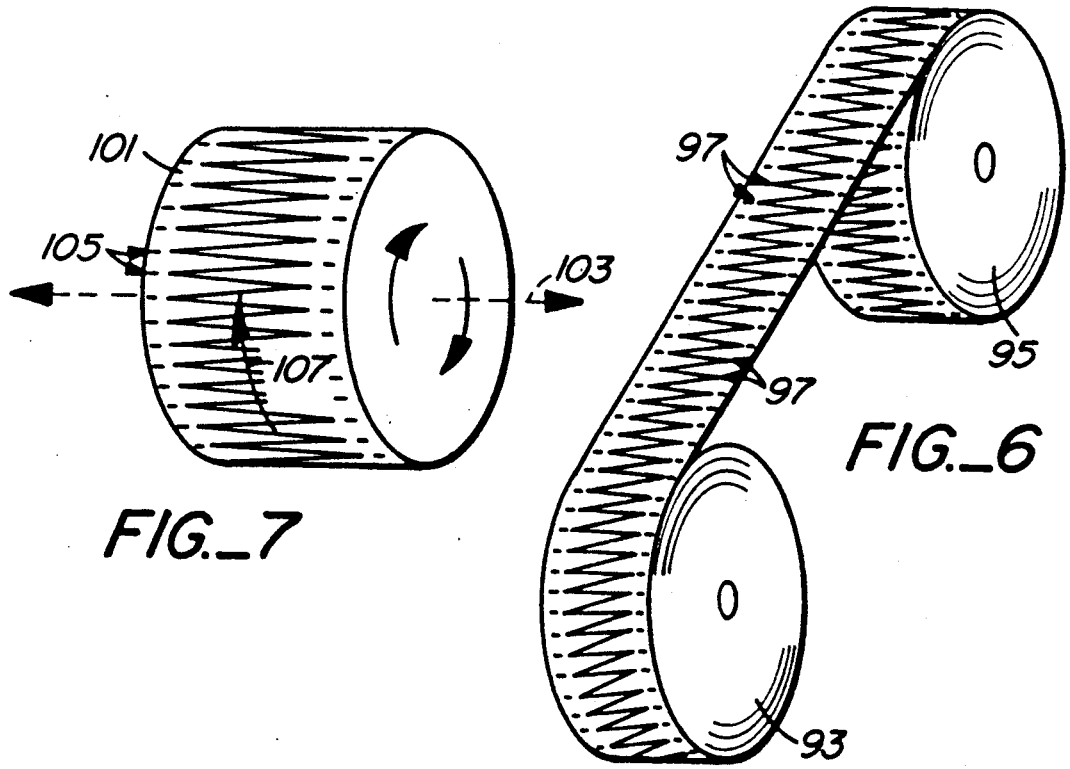
FIG._7
FIG._6

HIGH DENSITY DATA TRACK LAYOUT FOR STORAGE MEDIA

TECHNICAL FIELD

The present invention relates to data storage media, such as optical read-only media in a card format, and in particular to media in which data is encoded in a plurality of physically distinct tracks on the media.

BACKGROUND ART

In U.S. Pat. No. 4,634,850, Pierce et al. describe an optical data storage medium having a data layout in the form of contiguous nonoverlapping rows and columns of memory cells. Data is recorded as optically contrasting spots, representing bits, in the memory cells. The presence or absence of a spot in any particular memory cell thus represents either a zero or one. Rows of cells are read by a linear CCD array, one row at a time as the media advances. A servo system uses lines of track marks at the ends of the rows for proper alignment of the media with the CCD array.

Another data storage system of the prior art is shown in FIG. 1, a read-only memory card 11 has data digitally encoded into a pattern of reflective (or transmissive) and nonreflective (or absorptive) areas 13 and 15 aligned in tracks 17. A card reader 21 makes use of a single light beam 23 focused to a spot 25 on the card 11 which in size is equal to or smaller than the size of the pattern areas 13 and 15 contained on the card 11. The light source 27 can be a laser, a light emitting diode or an incandescent bulb. Collimating and focusing optics 29 and 31, as well as a beamsplitter 33, may be used to direct and focus the beam 23 to spot 25. The card 11 or the beam 23 or both are moved relative to one another so the spot 25 scans the length of a track 17. Light reflected from the card 11 is detected by a light detector 35, which generates an electrical signal 37. Detector 35 can be a photocell, photomultiplier or any other device capable of converting light to an electrical signal. In this card reader 21, the data pattern areas 13 and 15 are passed under the focused light beam 23 without the aid of any servo mechanism to track the pattern as it passes by. However, the initial x-direction or cross-track placement of the beam spot 25 relative to a data pattern track 17 may be controlled with the aid of a marker 19 at the beginning of each track 17 so that the spot 25 is centered on the track or before the reading operation. This type of reader has an advantage of being simpler and less costly than those having servo track following mechanisms.

In such a prior art system with no servo mechanism and centering only at the start of a data pattern track, the pattern areas 13 and 15 must be made sufficiently large so that mechanical tolerances of both the read-only memory card 11 and the card reader 21 do not affect the integrity of the retrieved data. In particular, because there is no servo mechanism to bring a deviating beam spot back to the middle of a track, one must take skew into account. Skew can be due to both card manufacturing tolerances and reader mechanical tolerances. The conventional approach uses data pattern areas which are rectangular bars aligned in long rectangular tracks. The width of the bars, and therefore of the tracks as well, is calculated based upon the worst case skew angle $\theta_{max}$, seen in FIG. 1A. The data pattern width is made equal to twice the maximum possible deviation $\delta_{max}$ from center at the end of a scan, where $\delta_{max} = L \tan \theta_{max}$ and L is the length of a track. Unfortunately, while relatively skew insensitive, this approach limits the data storage capacity for this type of system.

An object of the present invention is to provide a data storage medium for use with read systems with no servo track following which has a greater data storage density but is still relatively insensitive to skew during reading.

Another object of the present invention is to provide a method of encoding a data pattern on a data storage medium in a skew insensitive manner and with increased storage density.

DISCLOSURE OF THE INVENTION

The above objects have been met with a data storage medium having an improved track layout in which data tracks are triangular or trapezoidal, i.e. a truncated triangle, in shape and laid out on the medium so that they interlock, with odd and even tracks dovetailing with each other. The objects are also met with a method in which data is encoded in a triangular or trapezoidal track format by exposing a photosensitive material to actinic radiation through a mask containing that data in the same format, then developing the material to bring out the latent image data pattern formed thereby.

The data storage medium comprises a sheet of data storage material, which may be in the form of a card, tape web or drum. Preferably the material is an optical storage material of a read-only type. One form of data card includes a card base, a layer of the optical data storage material disposed on the card base and a transparent scratch-protective layer covering the optical data storage material. The material has a pattern representing data bits thereon, which pattern is arranged in a plurality of tracks. In optical storage materials the pattern comprises a set of optically contrasting marks arranged sequentially in the tracks. In cards the tracks can be aligned either substantially parallel to the length of the card or substantially perpendicular to the length of the card, i.e. across the card's width. In tape, the tracks may be aligned across its width, while on drums, the tracks may be aligned substantially parallel to the drum's axis of rotation.

Tracks are substantially triangular in shape with a width that continually increases from a starting point to an end point. Generally, the width increases at a constant rate that depends on the maximum allowable skew angle for a scan of the tracks. Tracks are arranged in an interlocking manner with adjacent tracks having starting points proximate to end points of the other, and vice versa, and with adjacent tracks being preferably contiguous.

This track layout has an advantage that a reader with no servo track following will continue to read the pattern in a track without deviating out of the track despite the presence of skew. The track width increases as a scan proceeds from start to finish. Further, since the area of a triangle is one-half that of a rectangle with the same base width and length, the layout allows up to twice the amount of data to be stored in a given area of the medium as the conventional approach.

BRIEF DESCRIPTION OF THE DRAWINGS

FIG. 1 is a simplified perspective view of a prior art data storage system having a card medium and a card reader.

FIG. 1A is a top plan of a single conventional data track of the card medium of the prior art in FIG. 1, illustrating the determination of a skew insensitive track width.

FIG. 2 is a top plan of a data card medium of the present invention.

FIG. 2A is a partial side section of the medium taken along the line 2A—2A in FIG. 2.

FIG. 3 is a simplified top plan of seven data tracks from the medium in FIG. 2.

FIG. 4 is a side section of a photosensitive storage material covered by a mask, illustrating a method of forming the medium in FIG. 2.

FIG. 5 is a top plan of an alternate data card medium of the present invention.

FIGS. 6 and 7 perspective views of further alternative media in accord with the present invention.

BEST MODE FOR CARRYING OUT THE INVENTION

With reference to FIG. 1, the present invention differs from prior art media, like the data card 11, principally in the layout of the pattern of data marks on the storage material that makes up the media, most notably in the shape of the tracks. Tracks 17 of the prior art are conventionally of constant width with constant width rectangular marks therein. As will be seen, tracks of the present invention are substantially triangular in shape with the width of each track increasing from a start point to an end point. As will also be seen, this difference in track shape leads to other differences in track arrangement and the sequence of data bits. However, the reading apparatus 21 of the prior art continues to be applicable to media of the present invention. In fact, when used with reading apparatus that lack servo track following, like apparatus 21, the media of the present invention have an advantage of substantially greater data density than prior art media 11, because of the difference in track shapes.

With reference to FIGS. 2 and 2A, a data card 41 of the present invention comprises a wallet-size card base 43 on which a layer of optical data storage material 45 is disposed. A transparent scratch-protective cover layer 47 is disposed over the storage material 45. A typical width and length of card 41 is approximately 54 mm and 85 mm, respectively. These dimensions are not critical, but preferred for card media because such a size easily fits into a wallet and has historically been adopted as a convenient size for automatic teller machines and the like. Card base 43 is a dielectric and usually a plastic material such as polycarbonate or polyvinyl chloride. In optical data cards, base 43 preferably has a specular reflectivity that is less than 10%. Base 43 can also be transparent.

Storage layer 45 is preferably in the form of a strip approximately 35 mm wide, as long as the card, and about 100 to 500 micrometers thick. However, these dimensions are not critical. Layer 45 is typically a read-only optical data storage material which has been formed with prerecorded data. The capacity of the material should be such as to hold the equivalent of scores of pages of text. One method whereby data storage material may be formed and prerecorded is described in U.S. Pat. No. 4,304,848 to Bouldin et al., assigned to the assignee of the present invention. The method allows reproduction of data from a master as seen in FIG. 4.

In this method, a master data storage medium 51 has a pattern of opaque and transmissive areas, 53 and 55 respectively, representing data bits. Depending on the process to be used, the pattern in the medium 51 may be either a positive or negative version of the data to be recorded in the material 45. The master 51 is disposed over the photosensitive material 45, then actinic radiation is shone onto the master 51. Master 51 acts as a mask, allowing actinic radiation to expose portions of the photosensitive material 45 through the transmissive areas 55. Typically, the photosensitive material 45 is a silver-halide emulsion on a backing in which exposure to actinic radiation causes a latent image to be formed. In the method described in the above noted patent, after the master 51 has been removed, the material 45 is chemically developed black. Next, the developed medium is fogged to create a latent image layer of silver precipitating nuclei. Finally, the fogged medium is placed in a monobath for partial chemical development and substantial physical development. The resulting storage medium 45 has areas of low reflectivity, typically under 5%, which correspond to the transmissive areas of the master 51, and areas containing metallic silver particles, typically having a reflectivity exceeding 25%, which correspond to opaque areas of master 51. Thus the resulting medium has a set of optically contrasting marks of two different reflectivities. The formation and recording is usually done before the medium 45 is disposed on the card base 43, but could also be done in situ.

Other optical media capable of being photographically prerecorded with the aid of a mask may also be used. For example, the various silver-based media described in U.S. Pat. Nos. 4,269,917; 4,278,756; 4,278,758; 4,284,716; 4,298,684; 4,312,938; 4,314,260; 4,363,870; 4,383,024; 4,396,701; 4,463,089; 4,753,864 and 4,837,134 may be used. While most of these media are intended as laser recordable media, they may be prerecorded with read-only data. While media based on the observance of contrasting reflective and nonreflective marks are preferred, media based on the observance of contrasting transmissive and opaque marks may also be used. Non-silver-based media such as diazo media can also be used. Instead of media layers disposed on a supporting base, the media layers can be self-supporting sheets which need not be disposed on a separate base. Even non-optical media, for example, magnetic media with domains of contrasting magnetic polarity, could be used with the present invention, provided the tracks are substantially triangular or trapezoidal, i.e. truncated triangle, in accord with the present invention.

The invention relates to the layout of data on the medium, whichever type of media is used. As seen in FIG. 2, the storage material 45 has a pattern of contrasting marks 61 and 63 arranged in a plurality of tracks 65 and 66. The tracks 65 and 66 substantially triangular in shape, the widths thereof increasing from a start position to an end position. In FIG. 2, marks 67 are encoded adjacent to the start points of tracks 65. Similarly, other marks 68 are encoded adjacent to the start points of tracks 66. Marks 67 and 68 are used for centering a reading apparatus on the tracks 65 and 66 respectively at the start of each scan. Synchronization marks 69 may also be prerecorded in a beginning portion of the tracks 65 and 66 for calibrating the timing of a reader. Tracks 65 and 66 are interleaved and oppositely directed with tracks 65 proceeding from left to right in FIG. 2, and tracks 66 proceeding from right to left. Thus, the start points of tracks 65 adjacent to positioning marks 67 are proximate to end points of adjacent tracks 66, and vice versa. Tracks 65 and 66 are preferably contiguous for greatest storage density. Although, the storage media would normally be nearly completely filled with data marks 61 and 63, for clarity FIG. 2 only shows two adjacent tracks with data. The track boundaries are indicated by lines 71 to show where the pattern of marks would be encoded. On an actual data card, the boundary lines 71 would not exist, rather only the data marks 61 and 63 would exist. Further, although only two types of marks, highly reflective and nonreflective, are shown to represent binary digits 0 and 1, sets of more than two contrasting types of marks distinguished by multiple reflective levels or color could be encoded in some media.

With reference to FIG. 3, the interlocked triangular data tracks 65 and 66 are shown with the change in width greatly exaggerated for clarity. The pattern of marks 61 and 63 are trapezoids which completely fill a track from boundary edge to boundary edge. Again only one track is shown with data for clarity, the boundary lines 71 indicating the extent of the other tracks. The start and stop points of the tracks 65 and 66 are lined up on track ends 73 and 75, with tracks 65 having start points on track end 73 and end points on track end 75, and with tracks 66 having start points on track end 75 and end points on track end 73. The length L of all of the tracks is typically about 75 mm for wallet size cards like that in FIG. 2.

Positional marks 67 and 68 near the start points of each track 65 and 66 are used, as indicated above to center a scanning beam spot on the tracks 65 and 66. The width $W_s$ at the start of a track 65 or 66 is made to be approximately twice the x-direction positioning error, where the x-direction is across the width of the track and a z-direction is along the length of a track from start to finish. A typical x-direction positioning error for a reading apparatus using positioning marks on a card would be not more than 5 micrometers, so the start of each track would typically be about 10 micrometers wide.

The width of the data pattern geometry increases from start point to end point to compensate for the fact that, due to some skew being inevitable, the focused light spot usually drifts away from the center line 77 of a track as it scans the medium. The width $W_e$ at the end of a track 65 or 66 is determined by accounting for the positioning error in a scanning beam that is accumulated over the length of a scan for the worst allowable skew. Generally, the positional rate of increase of track width is a constant equal to $2\tan\theta_{max}$, where $\theta_{max}$ is the maximum allowable skew angle with respect to a track's center line 77 and where the factor 2 is needed because skew caused deviations can be on either side of the center line. After a scan of length L, the maximum possible allowable deviation $\delta_{max}$ from the track center 77 is $L\tan\theta_{max}+\delta_s$, where $\delta_s=\frac{1}{2}W_s$, the maximum start positioning error. Accordingly, the end point track width $W_e$ is made to substantially equal to $W_s+2L\tan\theta_{max}$. For example, if a reader with a start positioning error of ±5 micrometers and a maximum allowable skew of ±1' arc is used to read a track of length 75 mm, that track would have a start width $W_s$ of about 10 micrometers and an end width $W_e$ of about 54 micrometers. In other words, the width of the data pattern marks 61 and 63 would increase from 10 to 54 micrometers from start to stop of a track.

Tracks are essentially very long trapezoids with start and end points forming the top and bottom bases of the trapezoid. However, in most cases, the x-direction positioning error at the start of a track will be much less than the error due to angular skew accumulated at the end of the track, so that tracks are substantially triangular. One could describe the tracks as essentially isosceles triangles with their apex portions cut off at the start of the tracks. Because the area of a triangle is one-half of that of a rectangle having the same base and height (i.e. track width and length), up to twice the amount of data can be stored in the same media area. In the example given above, which is for a reader with a relatively large start positioning error, the data density is increased by approximately 70% over conventional track layouts.

Data marks 61 and 63 on the tracks 65 and 66 are arranged on the tracks in sequence so that the data bits they represent proceed in a forward direction from the start point of a track to the end point of the track. Tracks 65 and 66 are usually read in a zigzag or serpentine fashion, in which data is arranged back-to-back from one track 65 to an adjacent track 66 in the reverse direction. Alternatively, the data could be arranged as a sequence of multibit bytes, where the bits in each byte are encoded on different tracks. Because tracks are unidirectional, tracks 65 in a set containing bits in the same byte would be separated from other tracks in the set by oppositely-directed intervening tracks 66 of another set. Such a data arrangement may be read using a detector array reading every other track in a first direction, and then reading the other tracks interleaved with first in the opposite direction.

With reference to FIGS. 5-7, while the card media format seen in FIG. 2 is preferred other formats could also be used. FIG. 5 shows another data card 81 in which tracks 85 on a storage layer 83 are aligned across the width of the card 81, i.e. substantially perpendicular to a length direction 87 of the card. The width of the tracks 85, which in this embodiment is in the card length direction 87, increases along the track length, in the card width direction, from start to end, in a manner similar to the tracks 65 and 66 in FIG. 2. In FIG. 6, the medium is in the form of a tape web 91 wound on a pair of reels 93 and 95. Here the tracks 97 are aligned across the width of the tape web, and are again substantially triangular in shape with adjacent tracks being oppositely directed. In FIG. 7, the storage medium has the form of a cylindrical drum 101 with a central axis of rotation 103. Triangular shaped tracks 105 are aligned across the drum parallel to axis 103, i.e. perpendicular to the direction 107 of advancement of the drum surface. In each of these embodiments in FIGS. 5-7, the medium may be advanced incrementally one track at a time past a reader scanner like that seen in FIG. 1.

I claim:

1. A data storage medium comprising,
a sheet of data storage material having a plurality of tracks, each track having a plurality of data bits therein, each track having a starting point and an end point at opposite ends thereof, each track having a width that continually increases from said starting point to said end point, adjacent tracks having said starting points proximate to said end points of each other.

2. The data storage medium of claim 1 wherein said sheet of data storage material has the form of a card with a length and a width.

3. The data storage medium of claim 2 wherein said tracks are aligned substantially parallel to the length of said card.

4. The data storage medium of claim 2 wherein said tracks are aligned across the width of said card.

5. The data storage medium of claim 1 wherein said sheet of data storage material has the form of a tape web, said tracks being aligned across a width of said tape web.

6. The data storage medium of claim 1 wherein said sheet of data storage material is in the form of a drum, said tracks being aligned substantially parallel to a drum axis of rotation.

7. The data storage medium of claim 1 wherein said data storage material is an optical storage material with said pattern representing data bits comprising a set of optionally contrasting marks arranged sequentially in said tracks.

8. The data storage medium of claim 1 wherein said tracks have positioning marks located proximate to said starting points of said tracks.

9. The data storage medium of claim 1 wherein each of said tracks has a positional rate of change in said width which is substantially equal to the constant $2\tan \theta_{max}$, where $\theta_{max}$ is the maximum allowable skew angle for a scan of said tracks.

10. The data storage medium of claim 1 wherein data represented by said pattern is ordered in a sequence proceeding from starting point to end point from one track to another.

11. The data storage medium of claim 1 wherein data represented by said pattern is ordered in a sequence of bytes proceeding from starting points to end points of one set of multiple tracks to another set of multiple tracks, tracks in a set being separated from other tracks in the same set by intervening tracks.

12. The data storage medium of claim 1 wherein adjacent tracks are contiguous.

13. A data storage card comprising,
a wallet size card base having a layer of optical recording material thereon, said material having dovetailing odd and even triangular or trapezoidal data tracks, with the apices of odd tracks adjacent the bases of even tracks in an interlocking manner each of said data tracks having a plurality of data bits therein.

14. An optical data card comprising,
a card base,
a layer of optical data storage material disposed on said card base, said layer having a pattern of contiguous, alternately oppositely directed, substantially triangular data tracks, each track having a plurality of optically contrasting marks therein, and
a transparent scratch-protective layer disposed over said layer of optical data storage material.

15. The data card of claim 14 wherein said tracks are aligned substantially parallel to a length of said card base.

16. The data card of claim 14 wherein said tracks are aligned substantially perpendicular to a length of said card base.

17. The data card of claim 14 wherein each of said tracks has a shape represented by an isosceles triangle with an apex portion removed, said tracks having a length L, a starting line with a width $W_s$ and an end line corresponding to a base of said triangle with a width $W_e = W_s + 2L\tan \theta_{max}$, where $\theta_{max}$ is the maximum allowable skew angle of a scan of said tracks.

18. The data card of claim 14 wherein data represented by said pattern is ordered in a sequence proceeding from a starting end to a wider base end of said triangular tracks and from one track to another.

19. The data card of claim 14 wherein data represented by said pattern is ordered in a sequence of bytes proceeding from starting ends to wider base ends of multiple triangular tracks and from one set of said multiple tracks to another set of said multiple tracks, tracks in a set being separated from one another by oppositely directed intervening tracks of a different set.

20. A method of encoding data on a storage medium comprising,
disposing a mask over a layer of photosensitive material, said mask having a plurality of tracks, each track on said mask having a plurality of transparent and opaque marks therein, each track on said mask having a starting point to an end point at opposite ends thereof and having a width that continually increases from said starting point to said end point, adjacent tracks having said starting points proximate to end points of the other,
exposing said layer of photosensitive material to actinic radiation through said mask, whereby latent image of said pattern on said mask is formed on said material, and
developing said layer of photosensitive material to form a pattern in said layer of optically contrasting marks corresponding to said marks on said mask.

* * * * *